United States Patent
Sahores et al.

(10) Patent No.: US 9,429,038 B2
(45) Date of Patent: Aug. 30, 2016

(54) METHOD FOR MOUNTING SHIELDING ON A TURBINE CASING, AND MOUNTING ASSEMBLY FOR IMPLEMENTING SAME

(75) Inventors: Jean-Luc Pierre Sahores, Mazeres-Lezons (FR); Carole Jaureguiberry, Jurancon (FR); Jean-Maurice Casaux-Bic, Buziet (FR); Olivier Pierre Descubes, Nay (FR)

(73) Assignee: TURBOMECA, Bordes (FO)

( * ) Notice: Subject to any disclaimer, the term of this patent is extended or adjusted under 35 U.S.C. 154(b) by 727 days.

(21) Appl. No.: 13/817,057

(22) PCT Filed: Aug. 23, 2011

(86) PCT No.: PCT/FR2011/051946
§ 371 (c)(1),
(2), (4) Date: Feb. 14, 2013

(87) PCT Pub. No.: WO2012/025690
PCT Pub. Date: Mar. 1, 2012

(65) Prior Publication Data
US 2013/0142634 A1   Jun. 6, 2013

(30) Foreign Application Priority Data

Aug. 26, 2010   (FR) ..................................... 10 56795

(51) Int. Cl.
*F01D 25/24*   (2006.01)
*F01D 21/04*   (2006.01)
(Continued)

(52) U.S. Cl.
CPC ................. *F01D 25/24* (2013.01); *B21K 1/26* (2013.01); *F01D 21/045* (2013.01); *F02C 7/05* (2013.01);*F02K 1/82* (2013.01); *F04D 27/008* (2013.01); *F04D 27/0261* (2013.01); *F04D 29/522* (2013.01); *F04D 29/526* (2013.01); *F05D 2240/14* (2013.01); *Y10T 29/49323* (2015.01)

(58) Field of Classification Search
CPC .... F01D 25/045; F01D 25/24; F01D 25/243; F01D 25/26
USPC ...................... 415/9, 119, 135, 196
See application file for complete search history.

(56) References Cited

U.S. PATENT DOCUMENTS 2,722,801 A   11/1955 Lombard
2,795,108 A    6/1957 Saldin
(Continued)

FOREIGN PATENT DOCUMENTS

EP   0 132 182    1/1985
EP   1 467 066   10/2004
(Continued)

OTHER PUBLICATIONS

International Search Report Issued Feb. 24, 2012 in PCT/FR11/51946 filed Aug. 23, 2011.

*Primary Examiner* — Nathaniel Wiehe
*Assistant Examiner* — Woody Lee, Jr.
(74) *Attorney, Agent, or Firm* — Oblon, McClelland, Maier & Neustadt, L.L.P.

(57) ABSTRACT

A method and structure negating thermal inertia of a solid portion, such as shielding, which influences mechanical behavior of parts of an engine structure, by reducing forces transmitted to the engine structure during an event in which a turbine blade ruptures, while preserving mechanical strength and vibratory positioning. The structure includes a flexible fastener for a shield, enabling producing a fusible section. An assembly for mounting a shielding onto a casing of the engine structure of a turbine includes connection lugs and points for attachment to the casing and shielding. The attachment points are sufficiently spaced apart in accordance with curvature of the shielding and casing so connection between the lugs and the shielding or casing, and connection of the attachment points, are substantially tangential. The lugs are sized so the connection has sufficient flexibility to control vibratory positioning thereof and ensure sufficient mechanical strength under thermo-mechanical loads.

10 Claims, 2 Drawing Sheets

(51) Int. Cl.
*F02C 7/05* (2006.01)
*F02K 1/82* (2006.01)
*F04D 27/00* (2006.01)
*F04D 29/52* (2006.01)
*B21K 1/26* (2006.01)
*F04D 27/02* (2006.01)

(56) References Cited

U.S. PATENT DOCUMENTS

| | | | |
|---|---|---|---|
| 4,149,824 A * | 4/1979 | Adamson | F01D 21/006 |
| | | | 415/197 |
| 4,565,492 A * | 1/1986 | Bart | F01D 11/18 |
| | | | 415/116 |
| 4,648,795 A * | 3/1987 | Lardellier | F01D 21/045 |
| | | | 415/173.4 |
| 2003/0202876 A1* | 10/2003 | Jasklowski | F01D 11/025 |
| | | | 415/135 |
| 2006/0032237 A1 | 2/2006 | Aumont et al. | |
| 2008/0267770 A1 | 10/2008 | Webster et al. | |
| 2010/0232932 A1 | 9/2010 | Vauchel et al. | |
| 2011/0189009 A1* | 8/2011 | Shapiro | F01D 25/246 |
| | | | 415/209.3 |
| 2015/0003960 A1* | 1/2015 | Totten | F04D 29/526 |
| | | | 415/9 |

FOREIGN PATENT DOCUMENTS

EP    1 607 582    12/2005
FR    2 898 870    9/2007

* cited by examiner

METHOD FOR MOUNTING SHIELDING ON A TURBINE CASING, AND MOUNTING ASSEMBLY FOR IMPLEMENTING SAME

BACKGROUND OF THE INVENTION

1. Field of the Invention

The invention relates to a shield mounting method on a turbine casing of an engine structure, in particular a turbine mounted on an aircraft or a land industrial turbine, as well as a mounting assembly for implementing such a method.

2. Description of the Related Art

The field of the invention is more particularly the protection of engines, especially for power turbines, such as turbo-engines of aircrafts. The engine structure requires the presence of a protection shield to confine any part or element being able to break away from the engine structure or the casing. In particular, the shielding of a free turbine provides the retention of all free turbine blades upon an event of the "blade-shedding" type in case of overspeed. Indeed, the blades are built to break in a given speed range so as to guarantee the operation capacity of the engine under a given threshold and guarantee the integrity of the disks beyond such threshold.

Such a shield is in general embedded into the architecture of the engine casing and the adjacent parts. It can be limited to a solid portion. The shield is fastened to the casing through numerous assembling flanges or equivalent.

But it seems that the lifetime of such shielding flanges may be strongly limited. In particular, the differences in thermal inertia and stiffness between the flanges and the adjoining parts have an impact on the behavior of the parts in transition states, i.e. in power rise or drop.

According to another architecture, an internal shield running in a warm air is mounted between two casings. However, such an environment may limit the shield retaining capacities, which will then require more consequent thicknesses. Moreover, the presence of an external casing leads to a non negligible extra mass.

In such architectures, the efforts are directly transmitted to the engine structure. Such a transmission can lead to a progressive breaking away from the fasteners as well as shielding vibrations to the prejudice of the flight security.

Furthermore, there are shields fastened by screws arranged in high point by centering with pegs pointing at the screws. Such mounting requires precise and delicate adjustment to be implemented. Moreover, the lifetime of the pegs is random as regards vibratory transitions and other phenomena: "fretting", shearing, etc.

BRIEF SUMMARY OF THE INVENTION

The invention aims at overcoming the disadvantages of the above described technologies and, in particular, getting rid of the thermal inertia of the shielding acting on the mechanical behavior of the parts of the engine structure. It also aims at minimizing the shielding mass, while simplifying the mounting without being detrimental to the robustness of the shielding.

To do so, the invention provides a flexible shield fastener enabling to implement a fused section limiting the efforts transmitted to the engine structure.

More precisely, the object of the invention is to provide a shield mounting method on a casing of the engine structure of a turbine consisting in coupling through a tangential connection the shield on the carter between points of the shield and the casing sufficiently spaced apart in accordance with the curvature of the shield and the casing between such points so as to implement a flexible coupling between them being able to provide a vibratory positioning and a sufficient mechanical strength under a thermo-mechanical load. In the case of aircraft turbines, the vibratory positioning and the mechanical strength are then also mastered upon maneuvers of the aircraft.

In such conditions, it appears that the shield is sufficiently close to the casing so that the latter brings an advantageous contribution for retaining debris or ejected part fragments. The external shield stays sufficiently cold to guarantee for the parts being retained with quite weaker thicknesses.

Thus, such architecture enables a thermal and mechanical insulation of the shield as regard parts of the engine structure under casing, which could be subjected to a thermo-mechanical fatigue. Moreover the flexibility being generated allows to get rid of an adjustment device between the shield and the casing.

According to particular embodiments:
- a vibration dampening is also provided in connection with the coupling between the shield and the casing;
- a connection sizing is determined in accordance with the thermo-mechanical load to which the connections are submitted;
- the number of connections is determined and the connections distributed so as to minimize the efforts resulting from the thermo-mechanical transitions and thereby optimize the lifetime of the mounting as regards the load cases to which the engine is submitted and the vibratory positioning of the shield and casing assembly, in particular in the range of the low excitation frequencies.

For the implementation of the above described method, the invention also relates to a shield and casing assembly of the engine structure of a turbine comprising connection lugs between the casing and the shield with fastening points for the casing and the shield. In such assembly, the fastening points are sufficiently spaced apart in accordance with the curvature of the shield and the casing so that the connection is substantially tangential between the lugs, in the one side, and the shield or the casing, on the other side, to the fastening points, and that the lugs present a predetermined degree of flexibility.

According to particular embodiments:
- spring blades adapted to dampen vibrations are provided on a ring configuration between the shield and the casing;
- at least one fastening point on the shield and at least one fastening point on the casing are provided per lug;
- the lug fastening to the casing is implemented by screws in stiffening bosses welded to the casing skin, the screws presenting heads adapted to be moved in openings formed in the shield;
- the lug fastening to the shield is implemented by rivets crossing the shield;
- the mounting assembly comprises a number of connection lugs being adapted to the sizing, the lugs being regularly distributed and in a ring configuration between the casing and the shield and each lug being fastened by a screw to the casing and a rivet to the shield.

BRIEF DESCRIPTION OF THE SEVERAL VIEWS OF THE DRAWINGS

Other characteristics and advantages of the invention will appear upon reading of the detailed description of exemplary embodiments hereinafter, referring to the accompanying figures, wherein, respectively.

DETAILED DESCRIPTION OF THE INVENTION

Figure 1:
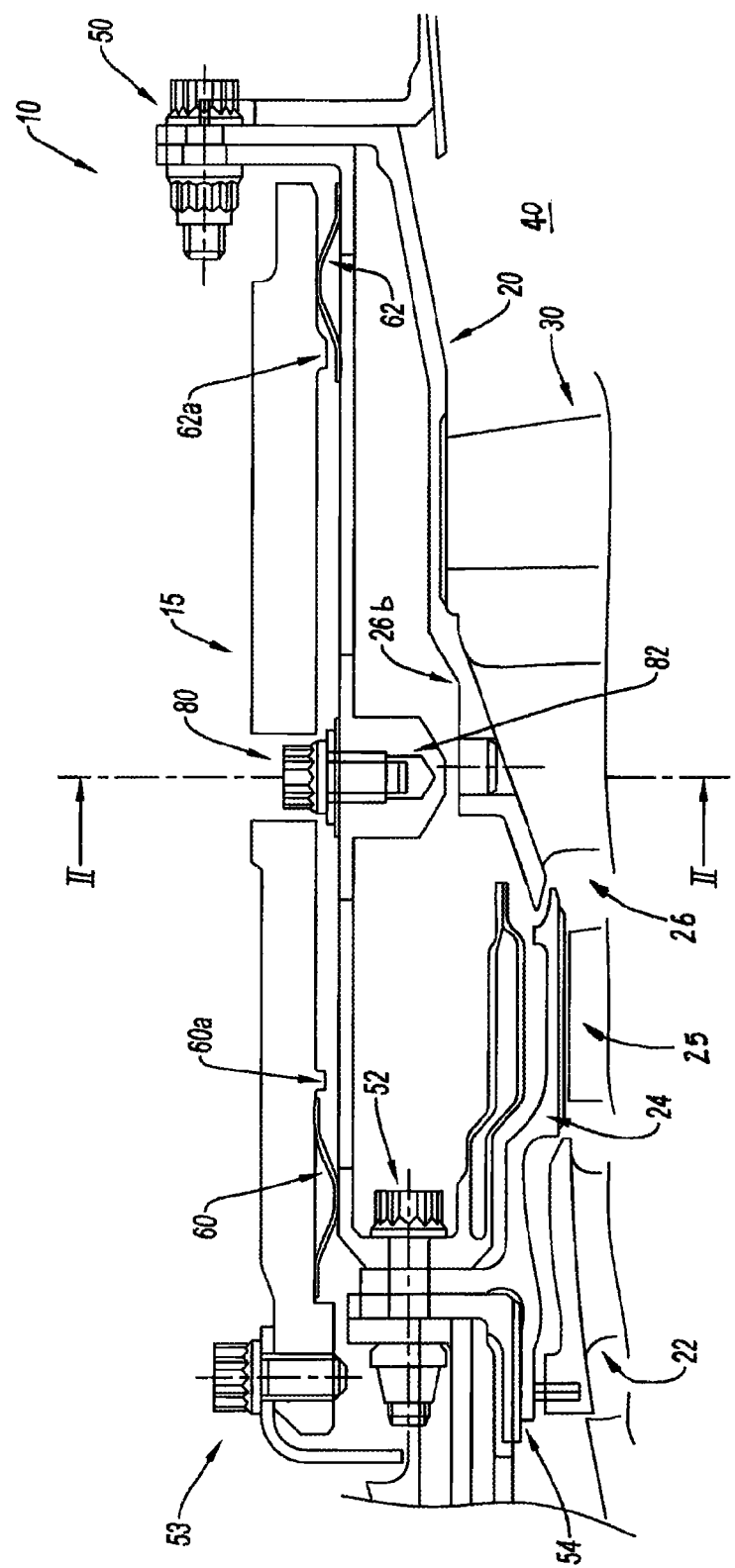
FIG. 1 is a partial sectional half-view along the longitudinal axis of a free turbine provided with a mounting assembly according to the invention.

Referring to the partial sectional view of FIG. 1, the free turbine 10 comprises in particular an external shield 15 and a casing 20 forming the main structure of the engine and to which the air vein forming elements are to be connected: the turbine distributors 22 and 26, the turbine rings 24 and 26b and the turbine wheels 25 and 30 through a bearing structure (not shown). Each blade system is made of a stationary vane system or air flux "distributor" stator followed—in the direction of the air flows—by a mobile blade or wheel system, and of an outlet vein 40 to get access to the nozzles (not shown).

The different seals are provided by flanges or joints 50, 52 and 54 between different parts being adjacent to the casing 20 itself in connection with the shield 15.

Furthermore, two spring blades 60 and 62 made of a metal sheet are provided between the shield 15 and the casing 20 so as to dampen the vibrations, for example upon thermo-mechanical transitions. Such blades are arranged in housings bordered by ribs 60a, 62a. Optionally, such blades can be fastened to a flange or a connection, for example on the flange 50 or the screw 53 in the example being illustrated.

The spring blades dampen the vibrations between the shield and the casing in connection with the coupling lugs between them. Advantageously, such blades can be axially split to as to efficiently dissipate the heat energy and improve the robustness of the assembly upon vibrations.

Figure 2:
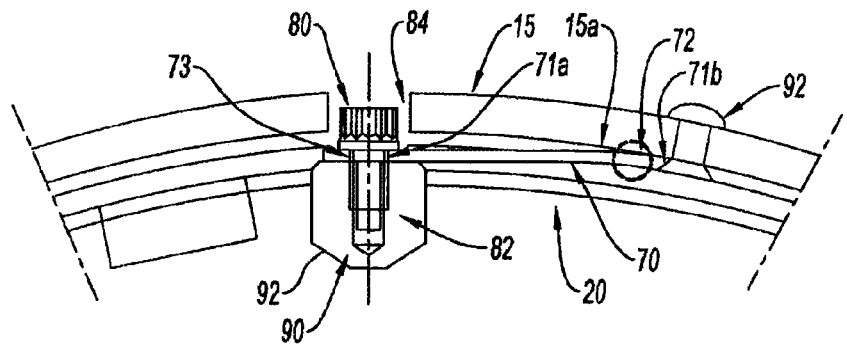
FIG. 2 is a partial view according to a plan II-II of the preceding view, underlining the position of one lug of the mounting assembly according to the invention.

A tangential lug 70 appears with more precision on the view of FIG. 2, in section II-II of FIG. 1, between a screw head 80 and the screw 82. The screw is inserted into a threaded boss 90 welded into the skin 91 of the casing 20. Optionally, the threaded boss 90 can be replaced by a nut. The screw head 80 is arranged in an opening 84 formed in the shield 15. The head 80 thus can, upon vibrations, freely oscillate in the opening 84.

The lug 70 is first mounted, through a hole 73 formed at one of its ends 71a, on a non threaded portion of the screw 82 and, at the other end, on a rivet 92 crossing the shield 15. The screw 82 is then completely inserted into the plot 90 and the rivet 92 is crushed. In such conditions, the lug 70 is mounted substantially tangential to the casing 20 and to the shield 15. To do so, the lug 70 is slightly curved in an area 72 so that—close to the rivet—the other end 71b thereof comes against the internal face 15a of the shield 15.

In the case of a rupture of the lugs 70, the shield 15 is substantially kept in place by the positioning of the screw heads 80 being close together in the openings 84 of the shield. Such close positioning also limits the passage of the spare parts. Moreover, the spring blades 60, 62 (FIG. 1) guarantee the shield being radially kept in the case of a rupture of the connection lugs.

The length of the lugs 70, and thus the distance between the screws 82 and the rivets 92, is in accordance with the similar curvature of the shield and the casing between screws and rivets so as to obtain tangential connections. The sizes of the lugs are adjusted in width, length and thickness to be adapted to the calculation of the thermo-mechanical load to which they are submitted so as to limit the transmission of the efforts to the casing and thus to the engine structure.

Figure 3:
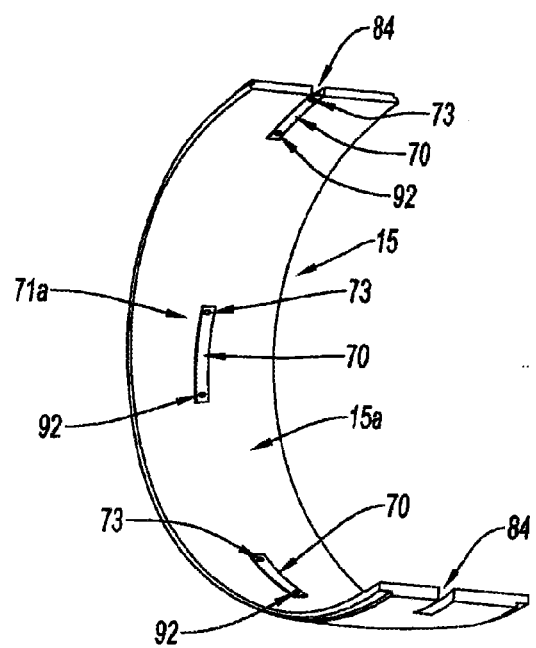
FIG. 3 is a partial perspective view of the shield provided with mounting lugs according to the invention.

On the partial perspective view of FIG. 3 of a half-shield 15, the connection lugs 70 appear regularly distributed on the internal face 15a of the shield 15 as well as the rivets 92 for fastening such lugs to the shield 15. The mounting holes 73 for the lugs 70 on the screws 82 (FIG. 2) are also visible. In such example, six lugs are thus provided for the whole shield.

The invention is not limited to the exemplary embodiments above described and shown. Indeed, the number of lugs can be more important so as to adapt the vibratory modes of the assembly and/or to guarantee the load resistance strength upon the flight maneuvers. In particular for land industrial turbines, the number of lugs can be a few tens, even more, due to the big diameters of this type of turbine.

Furthermore, the section of the rivets can be sized so that, upon a rupture of a blade, the efforts transmitted to the engine structure are limited. The lugs can have a general V- or W-shape so as to connect two or three shield fastening rivets to, respectively, one or two fastening screws on the casing.

The invention claimed is:

1. A shield mounting method for retention on a casing of an engine structure of a turbine, comprising:
   coupling a shield on the casing through a tangential connection oriented in a circumferential direction between points of the shield and the casing sufficiently spaced apart in accordance with a curvature of the shield and the casing between such points so as to implement a flexible coupling between the shield and the casing, configured to provide a vibratory positioning and a sufficient mechanical strength under a thermo-mechanical load,
   wherein a first end of the tangential connection is fastened to the casing via a fastener having a fastener head arranged in an opening of the shield, and
   wherein a second end of the tangential connection is connected to the shield and abuts an internal face of the shield.

2. A mounting method according to claim 1, wherein a vibration dampening is provided in connection with the flexible coupling between the shield and the casing.

3. A mounting method according to claim 1, wherein a connection sizing is determined in accordance with the thermo-mechanical load to which the tangential connection is submitted.

4. A mounting method according to claim 1, wherein a number of tangential connections is determined and the tangential connections are distributed so as to minimize efforts resulting from thermo-mechanical transitions.

5. A shield and casing assembly of an engine structure of a turbine, comprising:
   the shield;
   the casing;
   a connection lug between the casing and the shield with fastening points for the casing and the shield, the fastening points being sufficiently spaced apart in accordance with a curvature of the shield and the casing so that the connection lug is substantially tangential, and the connection lug presents a predetermined degree of flexibility, wherein a first end of the connection lug is fastened to the casing via a fastener having fastener head arranged in an opening of the shield, and wherein a second end of the connection lug is connected to the shield and abuts an internal face of the shield.

6. An assembly according to claim 5, wherein a plurality of spring blades configured to dampen vibrations is in a ring configuration between the shield and the casing.

7. An assembly according to the claim 6, wherein the spring blades are axially split.

8. An assembly according to claim 5, wherein at least one fastening point on the shield and at least one fastening point on the casing are provided per lug.

9. An assembly according to claim 5, wherein the lug fastening to the casing is implemented by screws in bosses welded to a casing skin, the screws presenting heads configured to be moved in openings formed in the shield.

10. An assembly according to claim 5, wherein the lug fastening to the shield is implemented by rivets crossing the shield.

* * * * *